US007998268B2

(12) United States Patent
Liu

(10) Patent No.: US 7,998,268 B2
(45) Date of Patent: Aug. 16, 2011

(54) METHOD TO PRODUCE DURABLE NON-VITRIFIED FLY ASH BRICKS AND BLOCKS

(75) Inventor: Henry Liu, Columbia, MO (US)

(73) Assignee: Ecologic Tech Company, Inc., Columbia, MO (US)

( * ) Notice: Subject to any disclaimer, the term of this patent is extended or adjusted under 35 U.S.C. 154(b) by 453 days.

(21) Appl. No.: 11/307,023

(22) Filed: Jan. 19, 2006

(65) Prior Publication Data

US 2007/0000412 A1    Jan. 4, 2007

Related U.S. Application Data

(60) Provisional application No. 60/595,392, filed on Jun. 29, 2005.

(51) Int. Cl.
*C04B 18/06* (2006.01)
*C04B 18/08* (2006.01)
(52) U.S. Cl. ........ 106/705; 106/724; 106/819; 106/823; 106/DIG. 1; 264/333; 264/DIG. 49
(58) Field of Classification Search .............. 106/DIG. 1, 106/705, 724, 819, 823; 264/333, DIG. 49
See application file for complete search history.

(56) References Cited

U.S. PATENT DOCUMENTS

| | | | | | |
|---|---|---|---|---|---|
| 4,121,945 | A | * | 10/1978 | Hurst et al. | |
| 4,268,316 | A | | 5/1981 | Wills, Jr. | |
| 4,624,711 | A | * | 11/1986 | Styron | 106/405 |
| 4,659,385 | A | * | 4/1987 | Costopoulos et al. | 588/257 |
| 4,756,761 | A | | 7/1988 | Philip et al. | |
| 4,780,144 | A | | 10/1988 | Loggers | |
| 5,110,362 | A | * | 5/1992 | Hoarty et al. | |
| 5,374,307 | A | * | 12/1994 | Riddle | 106/705 |
| 5,405,441 | A | * | 4/1995 | Riddle | 106/705 |
| 5,654,352 | A | * | 8/1997 | MacDonald | 524/18 |
| 5,766,338 | A | * | 6/1998 | Weber | 106/705 |
| 6,068,803 | A | | 5/2000 | Weyand et al. | |
| 6,251,178 | B1 | * | 6/2001 | Styron | 106/709 |
| 6,277,189 | B1 | | 8/2001 | Chugh | |
| 6,451,104 | B2 | * | 9/2002 | Mehta | 106/705 |
| 6,468,345 | B1 | * | 10/2002 | Zhu et al. | |
| 7,264,673 | B2 | | 9/2007 | Kayali et al. | |
| 2004/0069186 | A1 | * | 4/2004 | Zacarias et al. | 106/405 |

OTHER PUBLICATIONS

JP 07124535 (May 16, 1995) Sano abstract only.*
ASTM Standard C62, "Standard Specification for Building Brick (Solid Masonry Units Made From Clay or Shale," American Society for Testing and Materials, 1997, pp. 36-39.
Hu, R., "High-Pressure Compaction of Fly Ash Into Building Materials," M.S. Thesis, Department of Civil and Environmental Engineering, 2001, 87 Pages.
Li et al., "Compacting Solid Waste Materials Generated in Missouri to Form New Products," MDNR Award Project No. 00038-1, 2002, 90 Pages.
FHWA, "Fly Ash Facts for Highway Engineers," Federal Highway Administration, U.S. Department of Transportation, 2003, 81 Pages.
Chou, et al., "Manufacturing Commercial Bricks with Illinois Coal Fly Ash," Proceedings of the World of Coal Ash Conference, 2003, 22 Pages.
"Coal Ash: Its Origin, Disposal, Use, and Potential Health Issues," EPRI, 2004, 12 Pages.
Liu, H., "Compacting Fly Ash to Make Bricks," Final Technical Report, submitted to National Science Foundation, 2005, 15 Pages.
Kayali, O., "High Performance Bricks From Fly Ash," Proceedings of the World of Coal Ash Conference, 2005, 13 Pages.
Liu, et al., "Improving Freezing and Thawing Properties of Fly Ash Bricks," presented at World of Coal Ash Conference, Apr. 11-15, 2005, 16 Pages.
Liu, et al., Abstract entitled "Improving Freezing and Thawing Properties of Fly Ash Bricks" submitted for consideration for the World of Coal Ash Conference, Apr. 11-15, 2005.
Liu, et al., Presentation entitled "Improving Freezing and Thawing Properties of Fly Ash Bricks," presented at World of Coal Ash Conference, Apr. 11-15, 2005, 50 pages.
Supplementary European Search Report for EP 06735820, dated Dec. 17, 2009, 3 pages.

* cited by examiner

*Primary Examiner* — Paul Marcantoni
(74) *Attorney, Agent, or Firm* — Senniger Powers LLP

(57) ABSTRACT

A method of making durable, non-vitrified masonry units comprising fly ash, the method comprising mixing fly ash comprising a minimum of 15% CaO by weight and no more than about 10% loss on ignition, water, and an air entrainment agent to form a fly ash mixture; compacting the fly ash mixture in a shaping device by applying pressure of at least 1000 psi to the fly ash mixture; and curing the compacted fly ash mixture to cause the mixture to harden and gain strength.

20 Claims, No Drawings

METHOD TO PRODUCE DURABLE NON-VITRIFIED FLY ASH BRICKS AND BLOCKS

This patent deals with a new method to produce from fly ash durable (i.e., freeze/thaw resistant) masonry units such as bricks at room temperature, without having to heat the units in kilns at high temperature in order to vitrify the units, as it is required for ordinary masonry units made of clay. It is a new technology developed under a Small-Business Innovation Research (SBIR) grant awarded by the National Science Foundation (NSF) to the Assignee (Freight Pipeline Company), Project No. DMI-0419311.

BACKGROUND OF THE INVENTION

The background of the invention is described in the following sections:

Brief History of the Invention

Fly ash is the fine particles removed from the smoke generated by burning coal at power plants, before the smoke is emitted into the atmosphere. Each year, the United States consumes approximately 1.1 billion tons of coal, generating more than 60 million tons of fly ash [1]. Only about a third of the fly ash is used currently (in 2005), for purposes such as mixing with concrete as an additive, and using as part of the roadbed (underlay) of highways. The remaining two-thirds are unused, and they must be disposed of as a solid waste in landfills or slurry ponds, which is not only costly but also poses potential water pollution problems. It is highly desirable to find more beneficial use of fly ash, so that in the future less fly ash needs to be disposed of as a solid waste [2]. This patent application deals with a new technology that uses fly ash to make durable bricks, blocks, and other similar materials—hereafter referred to simply as "bricks"—for construction and other purposes. With this new technology, fly ash mixed with a small amount of water is compacted at room temperature to produce strong and durable bricks and blocks. Unlike the clay bricks which must be heated at high temperature to vitrify the clay, the fly ash bricks and blocks made by this technology need not be heated or vitrified. Hardening of the bricks is accomplished at room temperature by curing, in a way similar to the hardening of concrete products. Consequently, by using the non-vitrified fly ash bricks instead of the vitrified (fired) clay bricks, the fossil fuel used in vitrifying clay bricks and the air pollutant caused by burning the fossil fuel are both avoided, making the non-vitrified fly ash brick technology both energy-efficient and pollution-free. It constitutes the most energy-efficient and environmentally-friendly process of making bricks.

Previous research at University of Missouri-Columbia (UMC), conducted over the period 2000-2002 [3,4] and supervised by this inventor prior to his retirement from the University, has established that Class C fly ash from coal-fired power plants, upon mixing with a small amount of water, can be compacted in a mold or die to form a compact (brick, block or cylinder). Upon curing at room temperature, the compact hardens and becomes as strong as concrete products. However, tests showed that such fly ash products suffer from low resistance to freeze/thaw [4]. They can pass only about 8 cycles of freeze/thaw, which is far short of the 50 cycles required by the American Society for Testing and Materials (ASTM) [5]. Without being able to pass the ASTM standard on freeze/thaw, the bricks produced would deteriorate within a few years in cold climates, therefore having questionable value and little market in the United States, where most of its territory freezes in winter. It is for this reason that the UMC researchers did not apply for a patent on this new technology. Now that they have published their research findings for over three years [3,4], it is too late for them or anyone else to apply for a U.S. or foreign patents on this fly-ash-brick new technology without making significant improvement of the technology.

In 2004, this Inventor submitted a Small Business Innovation Research (SBIR) grant Phase-1 proposal to the National Science Foundation (NSF), to determine the feasibility of solving this freeze/thaw problem of the non-vitrified fly ash brick [6]. In this proposal, it was proposed that five different possible methods for solving the freeze/thaw problem of the fly ash brick be tested, to determine whether any of them can enhance the freeze/thaw resistance of the fly ash bricks sufficiently so that the bricks can pass the 50 freeze/thaw cycles required by ASTM. The five methods proposed were: (1) adding a small amount of nylon fiber to the fly ash in order to enhance the freeze/thaw resistance, (2) adding a small amount of cementing agents (Portland cement or lime) to the fly ash, to produce stronger and more durable bricks, (3) treating the fly ash bricks with a sealant to prevent or reduce water absorption and hence to reduce damage caused by freeze/thaw, (4) modifying the shape and geometry of the compaction mold, in order to make stronger fly ash bricks and to enhance the freeze/thaw resistance of the bricks, and (5) using a 2-piece mold to improve brick making. The proposal was selected for funding, and the project started on Jul. 1, 2004. Two types of Class C fly ash were used for making bricks for the tests—a high-grade fly ash that contains little (less than 0.5%) unburned carbon or loss-on-ignition (LOI), and a low-grade fly ash that contains much more (approximately 16%) unburned carbon or LOI. The former is the fly ash derived from burning coal in pulverized-coal burners, and the latter is derived from burning the same coal but of larger particle size in cyclone burners. The two types of fly ash were also mixed in different proportions in order to obtain fly ashes having different LOI ranging from 0.5% to 16%.

As reported in the final project report submitted to NSF in Mar. 2005 [7], only one of the above five methods, Method 1 (adding fiber), has shown some beneficial effect on the durability (i.e., the freeze/thaw resistance) of the fly ash bricks. For the high-grade fly ash bricks without fiber, it was found that the test samples started to develop cracks in as short as 4 cycles, and failed (broke apart into pieces) before 15 cycles. However, by adding 5 units of a commercially available Nylon fiber used normally in fiber concrete, the fly ash bricks started to crack in 7 cycles, but the bricks passed 50-cycles without falling apart or losing weight—cracked parts were held together by the fiber. Note that each unit of fiber is equivalent to 0.15% by weight of the dry fly ash used in making the brick. For the low-grade fly ash bricks, those without fiber started to develop crack in 25 cycles and failed (broke into pieces) in 31 cycles, whereas those with 5 units of fiber started to crack in 24 cycles but passed the 50 cycle with only minor surface damage. This shows that putting approximately 5 units of fiber in fly ash helps to make more durable bricks for both the high-grade and the low-grade fly ash, but the bricks made were still unable to pass 50 cycles of freeze/thaw required by ASTM Standards without damage or crack. A more effective method to improve the freeze/thaw resistance of the fly ash brick was needed.

Because none of the five aforementioned methods was sufficiently effective in solving the freeze/thaw problem of the fly ash bricks, additional methods were tested in the NSF Phase-1 project. They include using an optimum fly-ash-towater ratio, higher compaction pressure, longer curing time, and adding an air-entrainment agent into fly ash. It was found that while higher compaction pressure and longer curing time did produce stronger bricks (i.e., bricks of higher compressive strength), they alone did not produce more durable (i.e., freeze/thaw resistant) bricks. Apparently, the freeze/thaw resistance of the fly ash brick depends not only on the strength of the brick, but also on other brick properties such as ductility and permeability. Only by a proper combination of several measures that affect strength, ductility and permeability, to be reported next, can the brick be made more freeze/thaw resistant.

Through extensive tests reported in [7], it was found that by using an appropriate fly-ash-to-water ratio, appropriate compaction pressure, appropriate curing time, and by adding an appropriate amount of an air-entrainment agent during the process of making fly ash bricks, high-grade fly ash bricks can be made to pass a minimum of 50 freeze/thaw cycles without damage, and low-grade fly ash bricks can be made to pass at least 40 freeze/thaw cycles without damage. In all cases, no fiber or other additives other than the air-entrainment agent was used. The project also found that durable fly ash bricks can be made without using air entrainment when low-grade fly ash is mixed with high-grade fly ash at appropriate proportions, to be discussed in detail in a later section entitled

DETAILED DESCRIPTION OF THE INVENTION

A cost analysis was also performed in the NSF-sponsored study [7]. The result showed that it is far more cost-effective to use the air entrainment agents than to use Nylon fiber to enhance the freeze/thaw resistance of the fly ash bricks. For instance, while using fiber to enhance the freeze/thaw resistance of the fly ash bricks is expected to increase the manufacturing cost of each fly ash brick by approximately 3 cents, adding air-entrainment will raise the manufacturing cost of each brick by only about 0.5 cent [7]. Therefore, appropriate use of air-entrainment agents coupled with an optimization of certain other parameters appears to be the most effective and least expensive method to solve the freeze/thaw problem of fly ash bricks. The test results of the NSF sponsored study, including data on the effect of air-entrainment on freeze/thaw resistance, are given in details in the project final report [7], and are summarized in an award-winning conference paper [8]. This patent application uses the information and know-how gained from this NSF project to produce durable (freeze/thaw resistant) fly ash bricks and blocks. Depending on the shape and size of the mold used, bricks and blocks of practically any shape and size can be made by this method.

2. Field of Invention

The invention is in the field of utilization of fly ash or coal combustion byproducts to make bricks, blocks and other construction materials.

3. Description of and Comparison with Prior Art

The most relevant prior art is the study conducted at University of Missouri-Columbia (UMC), described and discussed in detail in References [3] and [4]. As summarized briefly in a previous section entitled "Brief History of the Invention," UMC researchers led by this inventor succeeded in developing a new method to make masonry units such as bricks, blocks and cylinders from using Class C fly ash by compacting the fly ash in a mold, and then letting the compacted green products cure and harden in a wet environment at normal room temperature. Strong units meeting the strength requirements of ASTM standard C62 [5] for building bricks were produced. However, through freeze/thaw tests, it was discovered that the units had poor freeze/thaw resistance. They were only able to pass about 8 freeze/thaw cycles without significant damage, which is far short of the 50 cycles required by the same ASTM Standard. By "significant damage", it is meant here that the unit either developed cracks longer than 1 inch, or lost more than 1% weight, or broke into two or more pieces. The current invention is a redesign and dramatic improvement of the UMC process/method, enabling the compacted fly ash units to pass 50 freeze/thaw cycles without damage. The improvement was made by using a new process to manufacture the fly ash brick. The new process, to be discussed in detail in later sections, is different from that used in the UMC study and other prior art in the following respects:

(a) The new process requires the use of an air-entrainment agent. The processes used in the UMC study and other prior arts do not involve, or even recognize the need for, using air-entrainment.

(b) The new process uses a different flyash-to-water ratio, F/W, than that used in the UMC method. While the UMC study used an F/W ratio equal to 9.0 for the high-grade fly ash and an F/W ratio of 5.67 for the low-grade fly ash, the corresponding F/W ratios found in this invention to be more appropriate to use are approximately 7 for high-grade fly ash and approximately 4 for low-grade fly ash. It was found through the NFS-sponsored study that the smaller F/W ratio (i.e., the wetter flyash-water mixture used in making bricks) can make stronger and more freeze/thaw resistant bricks.

(c) The new process uses a shaker to vibrate the flyash-water mixture in the mold prior to compaction. This reduces the density variation in the brick, resulting in more uniform strength and less damage due to freeze/thaw and handling.

Due to the foregoing differences, the new process being patented here is a significant improvement over the unpatented process developed at UMC. New patents are justified when significant improvements of any existing technology or process have been made.

Another relevant prior art is that by Riddle, U.S. Pat. No. 5,405,441 [9]. The 2004 patent is focused on using a dry material consisting essentially of "pozzolanic fly ash", which later in the patent claim was identified as "C-grade fly ash," blending it with water, then transferring the blended material to a compression zone, and compressing at a pressure of 1,000 to 2,500 psi. The patented process is very similar to the UMC process discussed before except for the lack of detailed information on the performance or property of the product (blocks) produced. There was no mentioning of the use of air-entrainment, and no mentioning of the freeze/thaw property of the fly ash products produced by Riddle. It is apparent that Riddle, prior to having patented the technology or process, did not test the freeze/thaw resistance of his products, and did not used air-entrainment in his process. Had he tested his products for freeze/saw, he would have found that the products had poor durability (freeze/thaw resistance), as was found in the UMC study in 2002 [4], and in the NSF-sponsored project in 2004 [7]. Therefore, the current invention resulting from the NSF-sponsored project is a major improvement over both this existing patent by Riddle and the unpatented UMC method. The current invention found a way to solve the serious freeze/thaw problem not solved by the previous works of both UMC researchers [7] and Riddle [9]. This means that what Riddle and the UMC researchers invented are two similar methods to make non-durable bricks—i.e., bricks that cannot pass ASTM standard on freeze/thaw. What the NSF project has accomplished, disclosed in this patent application, is a new method to make durable fly ash bricks that can pass ASTM standard on freeze/thaw. Being able to pass freeze/thaw standard means it is a higher-quality brick that cannot be achieved by using either Riddle's or the UMC method. Because over 90% of the United States is in regions where freeze/thaw occurs on an annual basis, it is highly important for bricks and blocks used outdoors, or on wall exterior, to have adequate freeze/thaw resistance as required by the ASTM Standard [5]. Without being able to solve the freeze/thaw problem, bricks and blocks made in the United States would have rather limited value and market.

Another relevant reference of prior art is U.S. Pat. No. 5,374,307 [10]. This patent, issued in 2005 under the same title, same abstract and the same inventor as U.S. Pat. No. 5,405,441, is essentially the same as U.S. Pat. No. 5,405,441 by Riddle, except for a modification of some claims. Therefore, all what have been said in the previous paragraph about Riddle's 2004 patent also apply to his 2005 patent.

Another relevant reference is a 1988 patent by Logger [11], entitled "Method for producing a building element from a fly ash comprising material and building element formed," U.S. Pat. No. 4,780,144. The patented method requires mixing coarse construction particles, such as sand or bottom ash or slag from coal-fired power plants, with a man-made binder that includes fly ash, water, and $Ca(OH)_2$, or a substance that can be converted to $Ca(OH)_2$. Then the mixture is formed in a mold to make building elements such as bricks. The resulting unhardened products are then heated to approximately 100° C. to harden. The process is significantly different from the current invention in that it requires the use of coarse particles, $Ca(OH)_2$, and elevated temperature (100° C.), none of which is required in the current invention.

Another relevant reference is a 1988 patent by Philip [12], entitled "Methods of making cementitious compositions from waste products," U.S. Pat. No. 4,756,761. The patent is focused on a method to make a dry cementitious material from combining different waste products, such as ferrous or non-ferrous slags, with a sulphate additive at elevated pH, and with adjusted levels of CaO and alumina. Since the patent is about making a dry mixture (powdered material) for use as a cementing material rather than making building bricks, it is significantly different from the current invention dealing with making fly ash bricks and blocks.

Another relevant reference is a 1987 patent by Costopoulos, et al. [13], entitled "Building Material Manufacturing from fly ash," U.S. Pat. No. 4,659,385. The patent deals with a method to make lightweight insulating building materials, such as wall boards, from a mixture of fly ash and other materials. In this method, fly ash is combined with a bonding agent (binder), a foaming agent and air-entrained water, to produce a mixture that is relatively light, resistant to fire, and has good insulation value. The main difference between this invention by Costopoulos and the current invention is that the current invention requires no bonding agent and no foam agent. Also, the two methods produce very different products—one produces lightweight insulating board and the other heavy bricks or blocks.

Another relevant reference is a 1986 patent by Styron [14], entitled "Light-weight aggregate," U.S. Pat. No. 4,624,711. The patent deals with a method to make light-weight aggregate, which is the coarse material needed for making light-weight concrete. It involves using Class C fly ash combined with surfactant foam, with or without other additives. The main difference between this invention by Styron and the current invention is that the current invention does not use surfactant foam, and hence the product is not lightweight. Also, the products of the two inventions are quite different and not interchangeable—one makes lightweight aggregate and the other makes heavy bricks and blocks. Due to these differences in products, the processes for making the products are also quite different.

Another relevant reference is a 1981 patent by Wills, Jr. [15], entitled "Masonry cement composition," U.S. Pat. No. 4,268,316. The patent deals with a method to produce masonry cement, using a mixture of Portland cement, kiln dust and fly ash. The product can be used to make bricks and blocks. The difference between this and the current invention is that the former requires the use of Portland cement and kiln dust in addition to fly ash, whereas the latter requires no use of Portland cement and kiln dust. Also, the former invention covers only the process to produce the special cement; it does not cover the process of making bricks and blocks. In contrast, the current invention covers the entire process of making bricks and blocks, not just how to prepare the dry mixture.

Another relevant reference [16] is a study conducted by Chou at the Illinois Geological Survey, using fly ash derived from Illinois coals, which is Class F fly ash, to make bricks and other related products. The process is essentially the same as that for making ordinary clay bricks, except for using Class F fly ash to substitute for a portion of the clay. As in the case of making ordinary clay bricks, the process involves heating green bricks in kilns at temperature exceeding 1,000° C. The high temperature melts or vitrifies the brick, converting clay and fly ash into a glassy product—the vitrified brick. Through this process, high quality bricks can be produced by using either clay only, or a clay and fly ash mixture. The bricks made have high strength, low permeability, and are durable—can pass the ASTM standard of 50 freeze/thaw cycles. The main drawback of this method to make bricks is it requires high temperature, which consumes much energy supplied normally by burning fossil fuel. The method both wastes energy and causes air pollution, including the generation of carbon dioxide which contributes to global warming. Also, due to the use of much energy, the cost of the brick is significantly higher than that of the fly ash bricks made from processes that require no heating—non-vitrified bricks. Note that the process embodied in the current invention requires no heating of the product, and hence the product is non-vitrified. It is very different from the process of Reference [16], even though the products of both processes are to be used for the same purposes.

Another relevant reference is a technology developed in Australia by Kayali [17]. The technology is similar to the one used by Chou in Illinois [16] except that it uses 100% fly ash (i.e., no clay or other additives are needed). Because high temperature exceeding 1,000° C. is used, the vitrified bricks are strong and have low permeability. It also has the same drawbacks as those mentioned before for the Illinois method—wastes energy, causes global warming, and costs more to produce.

4. Remarks on Existing Patents and Uniqueness and Originality of Current Invention Most of the relevant prior art (existing patents) on non-vitrified fly ash masonry units discussed before, such as [9, 10], are very vague in defining the kind of fly ash applicable to their invention, giving the impression that all fly ashes were the same, and their inventions were applicable to all kinds of fly ashes which is not possible. In reality, fly ash is a highly heterogeneous material, consisting of different ingredients depending on not only the coal used to produce the fly ash, but also the combustion conditions of the coal. Different types of coal (bituminous, sub-bituminous, anthracite and lignite) produce different types of fly ash. Same type of coal mined in different geographical regions also may produce quite different fly ashes. The current invention is the first to clearly point out this complexity and its impact on making durable (freeze/thaw resistant) vitrified fly ash masonry units.

The American Society for Testing and Materials (ASTM) classifies fly ash into two broad categories [18]: Class C and Class F. Class C fly ash is also referred to as high-calcium fly ash because it typically contains more than 20% CaO. It exhibits cementitious (self-cementing) properties, and hence can be used to make bricks and blocks without having to add any other cementing materials such as Portland cement or lime. Class C fly ashes are usually derived from burning sub-bituminous coals such as those from the Powder River Basin in Wyoming. On the other hand, Class F fly ash typically contains less than 10% CaO. It exhibits no cementitious properties, and hence cannot be used for making bricks or blocks without adding some cementitious materials or binders. Even for identical coal, burning the coal in different types of boilers (pulverized-coal, cyclone, stoker and fluidized-bed) produces fly ash of very different grain sizes and unburned carbon contents, which strongly affect the process used in making bricks and blocks. Therefore, in the utilization of fly ash for making masonry units such as bricks and blocks, not only should the Class of the fly ash (C or F) be specified, the unburned carbon content as indicated by the measured loss-on-ignition (LOI) must also be specified and utilized to affect the manufacturing process. All existing patents on making non-vitrified fly ash bricks failed to do so.

As has been proven through extensive laboratory tests in the most recent NSF-sponsored study conducted by this inventor [7], and the two earlier studies conducted at University of Missouri—Columbia [3, 4], fly ashes that contain high amount of unburned carbon (LOI greater than 10%), called "low-grade fly ashes", behave very differently from fly ashes that contain very low amount of carbon (LOI less than 1%), called "high-grade fly ashes". The latter, usually derived from pulverized-coal burners, makes much stronger and less porous masonry units than does the former, which is usually derived from cyclone, stoker or fluidized-bed boilers. Also, the high-grade ash must use much less water in preparing the mixture than that required for low-grade ash. All the existing relevant patents reviewed before on making non-vitrified fly ash bricks and other masonry units failed to mention how the carbon content (LOI) affect their process and products. Given the new knowledge that both the Class (C or F) and the Grade (Low LOI or High LOI) of fly ash have strong impacts on the process of making fly ash bricks and blocks, and the quality of their products, it is obvious that the process specified in each of the existing patents is applicable only to the Class and Grade of the fly ash used in their tests prior to their patent application. The current patent is the first to specify clearly how the LOI, and the CaO (calcium oxide) content, two commonly measured properties of fly ashes, affect the process of making fly ash masonry units. As will be shown in section entitled "DETAILED DESCRIPTION OF THE INVENTION", the current patent presents a method to make durable (freeze/thaw resistant) non-vitrified fly ash masonry units based on the content of the CaO and LOI of the fly ash, a new method applicable to a wide range of fly ashes of different values of CaO and LOI.

The subject invention is based on a massive amount of experimental data collected and new knowledge generated on the freeze/thaw property of fly ash masonry units [7]. The project, sponsored by the National Science Foundation, was an original research specifically aimed at solving the freeze/thaw problem that plagues compacted non-vitrified fly ash masonry units. Throughout the literature, only a few researchers (at the University of Missouri-Columbia) recognized or mentioned the freeze/thaw problem of the fly ash masonry units, and none of them solved the problem [4]. Other individuals, including those who have obtained patents on methods to make non-vitrified fly ash bricks, did not study or even mention the freeze/thaw property of their bricks in their publications or patents.

No previous study and no existing patent has demonstrated that it can produce durable non-vitrified fly ash masonry units—i.e., non-vitrified fly ash masonry units that can pass 50 cycles of freeze/thaw without significant damage or crack, as required by ASTM standard for building bricks [5]. The current invention based on the NSF-sponsored study is the only known technology that can produce durable (freeze/thaw resistant) non-vitrified fly ash masonry units.

The foregoing discussions show the originality and the uniqueness of the current invention.

5. Advantages of Invented Method (a) The invented method enables the production of durable (freeze/thaw resistant) non-vitrified (non-fired) fly ash masonry units, a feat never accomplished or claimed in previous inventions and publications.

(b) The fly ash masonry units made by this method can pass ASTM standards on freeze/thaw resistance, which is a minimum of 50 cycles, a feat never accomplished or claimed in previous inventions and publications.

(c) The method to be patented here is scientific. It is based on extensive experimental data coupled with a theory (two equations) that takes into account the influences of CaO and LOI on the process of making durable fly masonry units.

(d) The method is simple, effective, energy-efficient, and cost-effective.

BRIEF SUMMARY OF THE INVENTION

The object of this invention is a method (process) to make non-vitrified (non-fired) fly ash masonry units such as bricks and blocks that are durable--being able to pass 50 cycles of freeze/thaw as required by ASTM Standard C62 [5]. Prior art has demonstrated that non-vitrified fly ash bricks can be made from Class C fly ash, but the bricks made were not durable—they were able to pass less than 10 cycles of freeze/thaw, which is far short of the 50 cycles required by ASTM. The current invention sets forth a method to make durable non-vitrified fly ash masonry units that can pass 50 cycles of freeze/thaw. The method resulted from extensive research sponsored by the National Science Foundation (NSF), in which various methods for enhancing the freeze/thaw resistance of the fly ash bricks were tested and evaluated. The invention is based on the most effective method found to produce durable fly ash bricks. The method involves mixing fly ash with water that contains a small amount (much less than 1% by weight of the fly ash used) of an air-entrainment agent, the same type of agent that is normally used in air-entrained concrete. The process also requires careful control of the flyash-to-water ratio, compaction pressure, mixing of the fly ash with water, and mold vibration. Details of the process is described in the section DETAILED DESCRIPTION OF THE INVENTION. The fly ash masonry units produced by this method not only can pass 50 cycles of freeze/thaw but also possess strengths that meet the requirements of ASTM C62 for building bricks and other units to be used under Severe Weather (SW) conditions.

BRIEF DESCRIPTION OF THE DRAWINGS

No drawing is needed for this invention.

DETAILED DESCRIPTION OF THE INVENTION

This invention involves the following process or method for making non-vitrified (non-fired) fly ash masonry units: (1)

determining, and adjusting if necessary, the amount of CaO (calcium oxide) and LOI (Loss-On-Ignition) in the fly ash, (2) determining and adding an appropriate amount of water for making the durable fly ash masonry units, (3) selecting and mixing an air-entrainment agent with water, (4) mixing the water that contains the air-entrainment agent with the fly ash, (5) placing the flyash/water mixture into a mold, (6) vibrating the mold, (7) compacting the fly ash mixture in the mold using an appropriate pressure, (8) dislodging the compacted green product (masonry unit) from the mold, (9) transporting the dislodged green product to a curing room or curing chamber for proper curing. Upon completion of the foregoing nine steps, the cured products will be ready for storage and transportation to the marketplace for use in construction or other applications. Details of each of these nine steps are discussed as follows:

(1) Determining, and Adjusting if Necessary, the Amount of CaO (Calcium Oxide) and LOI (Loss-On-Ignition) in the Fly Ash—

The property of fly ash varies widely depending on not only the type of coal burned but also on other factors such as the coal particle size distribution and the type of the boiler (burner) used to burn the coal-whether it is a pulverized-coal burner, a cyclone burner, a fluidized-bed burner, or a stoker burner. Due to this variability, most power plants in the United States and in other nations monitor the chemical properties of their fly ash from each burner of their plants on a routine basis, by measuring the chemical composition of the ash such as the percentages of: silica ($SiO_2$), alumina ($Al_2O_3$), calcium oxide (CaO), sodium oxide ($Na_2O$), loss-on-ignition (LOI), and so forth.

The loss-on-ignition (LOI) is a measurement of the amount of unburned carbon in the fly ash due to incomplete combustion. More precisely, LOT is the amount (weight) of unburned volatile materials, mainly carbon, that exist in the fly ash, divided by the total weight of the fly ash, expressed in percentage. Power plants normally keep a good record of the measured properties of their fly ashes, no matter what the fly ashes are to be used for, even if they are to be disposed of as waste material. The record of fly ash property can be used in making durable fly ash masonry units—i.e., fly ash bricks, blocks and other products that can pass the 50 freeze/thaw cycles required by ASTM. The research sponsored by the National Science Foundation [7, 8], which resulted in this invention, found that two of these routinely measured fly ash properties are most important in affecting how to make durable fly ash masonry units. The two properties are the CaO (calcium oxide) content, and the LOI (loss-on-ignition). Generally, the more CaO is contained in a fly ash, the better the fly ash masonry unit is produced from such ash. On the other hand, the more LOI in a fly ash, the worse the fly ash masonry unit that is produced. The NSF project research found that to produce fly ash masonry units that can meet the ASTM durability standard of 50 freeze/thaw cycles, the fly ash used should have a minimum CaO concentration of 15% by weight, and a maximum LOI of 10% by weight, approximately. Within these limits, adherence to the next eight steps of the procedure described here will enable the production of durable fly ash masonry units.

If the fly ash does not have CaO and LOI within the aforementioned limits, durable masonry units can still be produced if measures are taken to alter the CaO and LOI contents before the fly ash is used to make bricks, so that the altered (adjusted) fly ash will have CaO and LOI within the aforementioned limits. If the CaO in the fly ash is less than 15%, one can add commercially available lime (CaO) to the fly ash, or other materials including fly ash that contain high concentration of CaO, in order to increase the CaO in the resultant mixture to above 15%. If the fly ash contains more than 10% LOI, one can mix the low-grade fly ash (i.e., fly ash containing more than 10% LOI) with a high-grade fly ash (i.e., fly ash with less than 10% LOI), so that the mixture contains less than 10% LOI.

The foregoing discussion of step 1 pertains to a recommended method to determine, and adjust if necessary, the minimum amount of the CaO and the maximum LOI allowed for making durable non-vitrified fly ash bricks. Since any Class C fly ash produced by burning subbituminous coal in a pulverized-coal boiler will satisfy these limits, the fly ash need not be adjusted for CaO and LOI before it can be used to make non-vitrified fly ash masonry units. The fly ash can be used as it is obtained from the power plant. On the other hand, any Class C fly ash produced by burning coal in an old (archaic) cyclone boiler will have CaO exceeding the 15% minimum, but will have LOI exceeding the 10% maximum. Thus, before this fly ash can be used to make durable fly ash masonry units, the LOI in the ash must be lowered to less than 10%. This can be done by mixing such low-grade fly ash with a high-grade Class C fly ash, or by other means. As to Class F fly ashes, they are generally low in CaO—less than 10%. Their LOI may be either low (less than 5%) if the fly ash is generated by a pulverized-coal boiler, or high (more than 10%) if generated by a cyclone boiler. Therefore, if a Class F fly ash is derived from a pulverized-coal boiler, the ash will have adequate LOI but insufficient CaO to make durable fly ash masonry units. To produce durable masonry units with such a Class F fly ash, either lime (CaO) or Portland cement must be added to the Class F fly ash. Note that Portland cement contains approximately 80% CaO. Alternatively, Class F fly ashes can be mixed with a sufficient amount of Class C fly ashes so that the CaO of the mixture is above 15%. Then, the mixture can be used to make durable fly ash masonry units.

(2) Determination of the Appropriate Amount of Water for Making Fly Ash Masonry Units—

The water used for making non-vitrified fly ash masonry units can be any clean water such as the tap water supplied by a city. Tests conducted under the NSF-sponsored project [7] showed that in order to make durable (freeze/thaw resistant) non-vitrified fly ash masonry units, it is highly important to use an appropriate amount of water for making each unit. The appropriate flyash-to-water ratio (F/W) needed to make durable fly ash masonry units depends on several factors including: the percent of CaO and unburned carbon or loss-on-ignition (LOI) in the fly ash, the particle size distribution of the fly ash, and the compaction pressure used to make the masonry unit. Generally, fly ashes that contain higher concentrations of CaO and higher LOI require more water or a smaller F/W ratio. Having a fly ash particle size distribution that creates large interstitial space or voids in the fly ash also requires more water or smaller F/W ratio. Finally, higher compaction pressure decreases the voids in the interstitial space and hence the flyash-water mixture will hold less water or require a higher F/W ratio.

At present, the appropriate F/W ratio for a given fly ash cannot be predicted from theory. However, it can be determined experimentally by compacting a few bricks or blocks made of the same fly ash at different F/W ratios. Through the NSF-sponsored study, it was found that if water is squeezed out of the mold during compaction, then the flyash-water mixture is too wet and the brick or block produced will suffer surface damage during subsequent freeze/thaw tests. On the other hand, if insufficient water is contained in the mixture, the fly ash masonry unit produced will develop cracks or fracture during the freeze/thaw test. The durable products (i.e., masonry units that can pass 50 cycles of freeze/thaw) are made from fly ash mixtures containing maximum amount of water (minimum F/W ratio) that does not squeeze out during compaction. Therefore, the appropriate F/W for any given fly ash is the F/W ratio corresponding to the maximum water that the mixture can hold in the mold during compaction without squeezing out water. This amount of water needed for making durable fly ash masonry units is to be referred to herein as the "compaction retention limit", or "CRL". To minimize the number of tests required to determine the CRL and the corresponding F/W ratio, the following calculation is helpful.

Based on laboratory tests conducted in the NSF-sponsored study, the appropriate F/W ratio corresponding to CRL depends on both the CaO (calcium oxide) content of the fly ash, and the percent of unburned carbon in the ash which is usually referred to as the LOI (loss-on-ignition). For any high-grade Class C fly ash that contains approximately 27% CaO and 0.5% LOI, the F/W ratio is in the neighborhood of 7. In contrast, for a low-grade Class C fly ash that contains approximately 27% of CaO and 16% LOI, the appropriate F/W ratio is in the neighborhood of 4. For values of LOI between 0.5% and 16%, the appropriate F/W ratio can be determined approximately from the following equation:

$$F/W = 7.104 - 19.4 \times LOI \quad (1)$$

For instance, when LOI is equal to 10% or 0.1, equation (1) yields F/W=5.16.

Note that equation (1) is valid only for Class C fly ash that contains approximately 27% of CaO by weight, which is the principal ingredient in the fly ash that reacts with water according to the following chemical reaction formula:

$$CaO + H_2O \rightarrow Ca(OH)_2 \quad (2)$$

From equation (2), and from the molecular weights of Ca, O and H, it can be proved that for each pound of CaO, 0.321 pound of water is needed for the chemical reaction. Therefore, when the CaO content in a fly ash is different from 27%, the value of F/W determined from equation (1) needs to be adjusted according to the CaO content difference. This is illustrated in the following two examples:

EXAMPLE 1

A Class C fly ash that contains 20% of CaO and 10% of LOI is used to make bricks. If 2000 grams of the dry fly ash is used for making each brick, what is the value of CRL, and what is the appropriate F/W ratio?

[Solution] Had the fly ash contained 27% of CaO, then from equation (1) we would have F/W=7.104−19.4× 0.10=5.16. Thus, for a brick made of 2000 grams of fly ash, the water required at CRL would be W=2000/5.16=387.6 grams. However, since the fly ash contains only 20% of CaO, which is 7% point (or 0.07×2000=140 grams) less than that assumed by equation (1), the 387.6 grams of water obtained from equation (1) must be reduced by 140×0.321=44.9 gm. Thus, the appropriate water content for this brick should be 387.6−44.9=343 grams. The corresponding appropriate F/W ratio is 2000/343=5.83.

EXAMPLE 2

A Class C fly ash contains 30% of CaO and 5% of LOI. Find the CRL and the appropriate F/W ratio that should be used in each brick

[Solution] From equation (1), the F/W ratio for LOI of 5% (i.e., 0.05) is 6.13, and the appropriate amount of water needed to make a brick that contains 2000 grams of fly ash is 2000/6.13=326 grams. Because the fly ash contains 30% of CaO, which is 3% point greater than the 27% assumed by equation (1), there is an excess CaO of 2000×0.03=60 grams, which requires an excess water of 60×0.321=19.3 grams. Thus, the water needed to make this brick at CRL is 326+19.3=345 gram, and the corresponding F/A ratio is 2000/345=5.80.

Note that the water for use in making a fly ash masonry unit calculated from the forgoing method includes not only the tap water or clean water that is used for mixing the fly ash but also additional water contained in any additive, such as the air-entrainment agent, used in making the fly ash masonry unit. Therefore, if 100 grams of a water-based additive is used in a fly ash mixture, and if 90 grams of the additive solution is water, then 90 grams of water must be deducted from the clean water or tap water determined from the foregoing method.

The aforementioned method to calculate the appropriate amount of water to make a fly ash masonry unit, or the F/W ratio, yields only approximate values not good enough for use as the final values in making durable fly ash masonry units. The final values must be found from actual compaction tests discussed before. The foregoing calculation is helpful in determining the approximate values of F/W to be used in the tests, so that a minimum number of tests, usually not more than five, would be needed to pinpoint the appropriate F/W needed for any given fly ash.

(3). Selecting and Mixing an Air-Entrainment Agent with Water—

Various air-entrainment agents are commercially available for use in making air-entrained concrete. They exist under different trade names and are manufactured by different companies. They are generally known to be effective in enhancing the freeze/thaw property of concrete products, though their effectiveness in enhancing the freeze/thaw property of fly ash products had never been recognized or tested prior to the NSF-sponsored project conducted by this inventor [7]. This project was the first to test the effectiveness of using air-entrainment agent, and several other different methods such as adding nylon fiber, to make durable fly ash bricks. It was found through such tests that the same air-entrainment agents used for concrete can be used in making fly ash masonry units of superior freeze/thaw property. Tests conducted under the NSF-sponsored project showed that use of such air-entrainment agents, when coupled with other measures described in the other steps of this process, can greatly enhance the freeze/thaw resistance of the fly ash masonry unit, enabling it to pass 50 freeze/thaw cycles, some over 100 cycles, without crack or other damages [7].

It was found that while the proper amount of the air-entrainment agent needed for making durable fly ash masonry units depends on the type of the entrainment agent used, the type of the fly ash, the curing time, and the compaction pressure, generally the proper amount is within the range recommended by the manufacturer for use in air-entrained concrete. Knowing this, it is not difficult to find out the optimum amount of the air-entrainment agent needed in each case through a few tests conducted with fly ash bricks made at several different concentrations of the agent. The tests must include not only freeze/thaw but also compressive-strength test. This is so because using large dosages of the air-entrainment agent usually weakens the masonry units (i.e., reduces the unit's strength significantly). One must make sure that the air-entrained bricks will have not only adequate freeze/thaw resistance but also adequate compressive strength that meets the requirement of ASTM for building bricks and other units [5].

For instance, a commonly used air entrainment agent for concrete is Daravair-1400, which is a product of the W. R. Grace Company. The dosage recommended by the manufacturer for use in air-entrained concrete is the range of 30 to 200 cc per 100 kg of the cement used in the concrete. This is equivalent to 0.03% to 0.2% based on the weight of the cement. Tests were conducted in the NSF-sponsored project by using this additive for making fly ash bricks. Three concentrations of the additive were tested: 0.1%, 0.2% and 0.4%, based on the weight of the dry fly ash used in making the brick. It was found that 0.1% produced the most durable fly ash bricks. For instance, for high-grade fly ash compacted at 1800 psi and cured for 15 days, the bricks made with 0.1% Daravair passed more than 70 cycles of freeze/thaw without any damage or crack.

Since the air-entrainment agent that can be purchased commercially is either a water based liquid, or a water-soluble powder, it can be mixed readily with water for use in making fly ash bricks. Mixing the agent with water is simply by diffusion, with or without the need for stirring or mechanical mixing. Preferably, the agent should be mixed with water first, and then the water containing the agent be mixed with the fly ash in a mixer. Simply pour the agent into water in a container, and allow some time for the agent to diffuse uniformly into the water. Then the water containing the agent will be ready in a short time for mixing with the fly ash. The time required for the agent to diffuse uniformly into the water depends on the container size and whether mixing is aided by stirring or agitation of the container. With stirring or shaking of the container, uniform mixing can be achieved usually within 30 seconds.

Through extensive testing conducted in the NSF project [7], it was found that while in most situations it was necessary to use air-entrainment to make durable (freeze/thaw resistant), non-vitrified fly ash masonry units, there is an exception. The exception exists when the masonry unit is made of a mixture of low-grade and high-grade fly ashes, at the low-grade-to-high-grade-fly-ash weight ratio, L/H, in the range of 0.25 to 0.5. This corresponds to a mixture LOI range of 2% to 5%, approximately. The tests showed that within this range, durable fly ash masonry units can be produced without having to use any air-entrainment agent. This is true only for fly ash containing at least 15% of CaO. For fly ashes that contain less than 15% CaO, addition of CaO will be needed to achieve the same result.

(4). Mixing the Fly Ash with the Water that Contains the Air-Entrainment Agent—

Mixing the fly ash with the water that contains the air-entrainment agent can be done in batches by using an appropriate mixer, such as a rotary concrete mixer when the volume is large, or a kitchen mixer when the volume is small. In continuous operation, a pugmill may also be used. The selection of the appropriate mixer for a given project is an engineering decision that must consider many factors including but not limited to the volume of materials to be mixed in each batch (for batch operation), the volumetric flow rate of the mixture to be supplied to a unit operation (for continuous operation), and cost. Depending on the mixer selected, some testing is required in the beginning of any project to establish the appropriate rotational speed of the mixer and the corresponding mixing time in order to achieve thorough mixing of the fly ash for making bricks. The mixing time should be sufficiently long to achieve thorough mixing, but not excessively long to prevent the fly ash mixture to set or harden in the mixer. Usually, this means a few minutes.

(5). Placing the Fly Ash Mixture into Molds—

After the fly ash mixture is adequately mixed, the mixture must be placed into a mold to produce the brick, block or other product shapes. While in laboratory tests this step is usually done manually by hand-feeding the mixed material into the mold, in commercial operation it must be automated in ways similar to conventional factories that manufacture concrete bricks (pavers) and blocks. Depending on the type of mixer used in a project, placing the fly ash mixture into molds can be done by different means such as direct pouring (by gravity), feeding by a screw conveyor, or injection molding.

(6). Vibrating the Mold—

Due to the use of relatively small amount of water in the mixture as described in step 2 of the process, upon mixing with water the fly ash is still relatively dry and forms innumerous small lumps or clumps that are not readily flowable by gravitational force alone. Thus, the mixture fed into the mold has large and non-uniform voids between the lumps, and the surface of the mixture is not leveled. If pressed (compacted) by a piston or plunger without first vibrating the mixture in the mold, the masonry unit produced may have non-uniform density distribution within each unit, which affects the quality of the unit, especially its durability (freeze/thaw resistance). Vibration of the molds causes the mixture to settle in the mold, producing both a more uniform mixture and a denser mixture with a more or less leveled surface. This helps to improve the quality control of the brick or block produced. Note that this step (vibration) is desirable but not necessary. It may not be needed in situations where the required quality of the masonry unit is not high, or the pouring of the fly ash mixture into the mold is sufficiently uniform to produce an acceptable product.

(7). Compacting Fly Ash Mixture in Mold—

The next step is to compact the fly ash in the mold (die) by using a piston or plunger. The mold is a cylindrical object with a bore of uniform cross-section to allow the entrance and penetration of the mold through the bore by a piston. The piston should have a head (i.e., the part in contact with the fly ash in the mold) that matches the shape of the mold, with a small clearance between the piston head and the mold to allow the piston head to slide into the mold snugly. The clearance between the remaining body of the piston (i.e., the piston shaft) and the mold should be larger to facilitate piston movement in and out of the mold without having the shaft contacting the mold. An alternative is to use a piston of uniform diameter or cross section (i.e., the piston head has the same diameter and/or cross-section as that of the piston shaft). However, in doing so, the risk of piston jamming in the mold is increased.

The piston and the mold may or may not be made of the same material. An appropriate material used in making the piston and the mold is steel, including stainless steel, although other metallic or non-metallic materials that have sufficient strength, hardness and workability can be used. It is desirable to have the mold's inner surface be a material harder than the piston-head material. To do so will allow the piston head rather than the mold to wear. Wearing of the piston head is of a lesser concern than mold wear, as the piston head can be replaced more easily at less cost than replacing a damaged mold. The mold may be made of either a single material such as stainless steel or heat-treated (annealed) steel, or two or more materials, such as having the main body (outside layer) of the mold made of wrought steel or stainless steel but the inside layer made of tungsten carbide, which can form a harder surface subject to less wear. Another alternative is to chrome-plate the inside of the mold. No matter what the material used, the inner surface of the mold should be smooth to minimize contact friction between the mold and the piston. The piston should be made of a non-corroding material, such as stainless steel or aluminum, which is not as hard as the material that makes up the inner surface of the mold, but sufficiently hard to minimize abrasion caused by contact with fly ash. The outer surface of the piston—the part in contact with the mold-should be smooth.

The shape and size of the piston and the mold depend on the shape and size of the masonry unit. For instance, for ordinary bricks, both the mold and piston head may have rectangular cross section. For brick with holes or surface indentations, the piston head must have teeth or protrusions of appropriate shape and size, etc.

The piston must be connected to a machine or device that can produce large linear force (thrusts), such as a hydraulic or a pneumatic press, to provide the force and pressure needed to compact the fly ash in the mold. Depending on the desired production capacity, each hydraulic or pneumatic press system may be used to drive either a single piston and mold, or a multiple of parallel pistons and molds. The compaction pressure needed to produce durable (freeze/thaw resistant) fly ash masonry units depends on the type of the fly ash used, the CaO content, the LOI, the curing time, the type and amount of the air-entrainment agent used, and other factors. It is usually in the range of 1,000 to 4,000 psi (pounds per square inch). Even though higher than 4,000 psi pressure can be used to produce durable bricks, it is unnecessary and costly. Quality control may be difficult to maintain for compaction pressure less than 1,000 psi. Smaller compaction pressure also requires longer curing time to attain sufficient strength of the fly ash masonry unit.

(8). Dislodging the Compacted Green Masonry Unit from the Mold—

Upon compaction of fly ash in the mold, dislodging the compacted masonry unit (namely, the "green masonry unit") from the mold can be done either by opening up the mold using a split mold design, or by pushing out the brick from inside a rigid (single-piece) mold by using either the same piston that compacted the brick or a different piston. Tests conducted in the NSF project that led to this invention found that there is little difference in the quality of the bricks produced by a split mold from that by a single-piece mold, though the latter method (i.e., use of a single-piece mold) appears to be less cumbersome and more amenable to mass production of fly ash bricks.

(9). Transporting the Dislodged Green Masonry Units to a Curing Room for Proper Curing—

As soon as a green fly ash masonry unit is compacted and dislodged from the mold, it should be transported to a curing room or curing chamber for curing. Such transport over a short distance can be done by various means including but not limited to belt conveyors. Curing of the green fly ash masonry unit is to be done in a manner similar to curing concrete products (e.g., concrete bricks and concrete blocks), which means exposing the green units to moisture. Curing is done by storing the green units in a moist room or chamber—called "curing room" or "curing chamber". The moisture can be supplied by spraying water to generate a mist in the room or chamber, or by supplying steam, in a manner similar to the curing of concrete products. The water in the moisture reacts with the CaO (calcium oxide) and other ingredients in the fly ash, causing both cementitious and pozzolanic reactions, which in turn cause the fly ash masonry units to harden and gain strength over time. Because fly ash reacts with water slower than cement does with water, the period needed for curing green fly ash bricks is normally longer than for curing concrete products. With moist-air curing (i.e., room-temperature curing using moist air generated by spraying mist), fly ash masonry units typically gain strength rapidly during the first week of curing, followed by continued but slower growth of strength thereafter. Strength growth becomes insignificant after 60 days of such curing. Curing can be sped up somewhat either by using warm steam to cure, or by immersing initially cured fly ash masonry units in water—called "water cure." Water cure should not be done immediately after the masonry units are made. The green fly ash units should first be cured in moist air for at least 24 hours before subjecting them to water cure. Premature water curing can damage, destroy or melt (dissolve) the green masonry units.

Once a fly ash masonry unit has completed curing, the unit can either be shipped immediately to the marketplace or constructions site for use, or be stored temporarily either indoor or outdoor before shipment. Once cured, fly ash units can be store at practically any moisture and temperature—preferably in a moist place with air temperature above freezing, which will cause the bricks to gain strength continuously as time progresses.

Note that the foregoing 9-step method was sometime described for making fly ash bricks only. Because the same method described can also be used for making similarly manufactured fly ash units such as blocks, tiles, stepping stones, etc., simply by using molds and pistons of different shapes and sizes, the term "brick" or "unit" used herein also includes such other products made from fly ash using the same 9-step method.

It should also be mentioned that although a 9-step method (process) is described here, some of the steps may not be needed in special situations. For instance, steps 1 and 2 can be omitted if through previous tests of the same kind of fly ash (i.e., using fly ash derived from the same boiler of the same power plant using the same coal), strong and durable bricks have already been produced using either this or another method. In such a case, just repeat the same method used before to produce the brick.

What is claimed is:

1. A method to produce durable, non-vitrified masonry units comprising fly ash, the method comprising:
   mixing fly ash comprising a minimum of 15% CaO by weight and no more than about 10% loss on ignition, water and an air entrainment agent to form a fly ash mixture;
   compacting the fly ash mixture in a shaping device by applying pressure of at least about 1000 psi to the fly ash mixture; and
   curing the compacted fly ash mixture to cause the mixture to harden and gain strength.

2. A method as set forth in claim 1 wherein the CaO content and/or loss on ignition of the fly ash are adjusted prior to mixing the fly ash with water and an air entrainment agent, such that the CaO content of the fly ash is greater than 15% by weight and the loss on ignition of the fly ash is less than 10%.

3. A method as set forth in claim 2 wherein the CaO content of the fly ash is adjusted by adding Portland cement, lime, or another fly ash, so that the CaO content of the adjusted fly ash is more than 15% by weight.

4. A method as set forth in claim 2 wherein the loss on ignition is adjusted either by removing unburned carbon from the fly ash or by mixing fly ash that contains more than 10% loss on ignition with another fly ash that contains less than 10% loss on ignition, such that the adjusted fly ash has less than 10% loss on ignition.

5. A method as set forth in claim 1 wherein the fly ash-to-water ratio in the fly ash mixture is in accordance with a compaction retention limit.

6. A method as set forth in claim 1 wherein the compacted fly ash mixture is exposed to a wet environment selected from the group consisting of a steam room and a mist chamber, during curing.

7. A method as set forth in claim 1 wherein the shaping device is a mold.

8. A method as set forth in claim 1 wherein the shaping device is an extruder.

9. A method as set forth in claim 1 wherein the fly ash mixture consists essentially of the fly ash, the water and the air entrainment agent.

10. A method as set forth in claim 1 wherein the CaO content and loss on ignition of the fly ash are adjusted such that the CaO content of the fly ash is greater than 15% by weight and the loss on ignition of the fly ash is less than 10%.

11. A method as set forth in claim 1 wherein the amount of water in the fly ash mixture is no greater than that which would produce free water upon compaction of the fly ash mixture.

12. A method as set forth in claim 1 wherein the masonry units withstand at least 50 freeze/thaw cycles as determined in accordance with ASTM Standard C62.

13. A method as set forth in claim 11 wherein the masonry units withstand at least 50 freeze/thaw cycles as determined in accordance with ASTM Standard C62.

14. A method to produce durable, non-vitrified masonry units comprising fly ash, the method comprising:
mixing fly ash comprising a minimum of 15% CaO by weight and no more than about 10% loss on ignition, water and an air entrainment agent to form a fly ash mixture, wherein the amount of water in the fly ash mixture is no greater than that which would produce free water upon compaction of the fly ash mixture;
compacting the fly ash mixture under external force in a shaping device; and
curing the compacted fly ash mixture to cause the mixture to harden and gain strength.

15. A method as set forth in claim 14 wherein the CaO content of the fly ash is adjusted by adding Portland cement, lime, or another fly ash, so that the CaO content of the adjusted fly ash is more than 15% by weight.

16. A method as set forth in claim 15 wherein the loss on ignition is adjusted either by removing unburned carbon from the fly ash or by mixing fly ash that contains more than 10% loss on ignition with another fly ash that contains less than 10% loss on ignition, such that the adjusted fly ash has less than 10% loss on ignition.

17. A method as set forth in claim 14 wherein the fly ash-to-water ratio in the fly ash mixture is in accordance with a compaction retention limit.

18. A method as set forth in claim 14 wherein the fly ash mixture consists essentially of the fly ash, the water and the air entrainment agent.

19. A method as set forth in claim 14 wherein the CaO content and loss on ignition of the fly ash are adjusted such that the CaO content of the fly ash is greater than 15% by weight and the loss on ignition of the fly ash is less than 10%.

20. A method as set forth in claim 14 wherein the masonry units withstand at least 50 freeze/thaw cycles as determined in accordance with ASTM Standard C62.

\* \* \* \* \*